(12) United States Patent
Okunlola et al.

(10) Patent No.: US 11,032,304 B2
(45) Date of Patent: Jun. 8, 2021

(54) ONTOLOGY BASED PERSISTENT ATTACK CAMPAIGN DETECTION

(71) Applicant: International Business Machines Corporation, Armonk, NY (US)

(72) Inventors: Olanrewaju O. Okunlola, Fredericton (CA); Christopher C. Fraser, Noonan (CA); Matthew P. Ouellette, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 16/208,942

(22) Filed: Dec. 4, 2018

(65) Prior Publication Data

US 2020/0177608 A1    Jun. 4, 2020

(51) Int. Cl.
*H04L 29/06* (2006.01)
*G06F 16/36* (2019.01)

(52) U.S. Cl.
CPC ........ *H04L 63/1425* (2013.01); *G06F 16/367* (2019.01); *H04L 63/1433* (2013.01)

(58) Field of Classification Search
CPC ............ H04L 63/1408; H04L 63/1425; H04L 63/1433; H04L 63/30; G06F 16/367
See application file for complete search history.

(56) References Cited

U.S. PATENT DOCUMENTS 9,166,997 B1 * 10/2015 Guo .................... H04L 63/1433
9,246,934 B2 * 1/2016 Sabin ................ H04L 63/1433

(Continued)

OTHER PUBLICATIONS

Bhatt, Parth et al., "Towards a Framework to Detect Multi-stage Advanced Persistent Threats Attacks", 2014 IEEE 8th International Symposium on Service Oriented System Engineering, Apr. 7-11, 2014, 6 Pages.

(Continued)

*Primary Examiner* — Eric W Shepperd
(74) *Attorney, Agent, or Firm* — Stephen R. Tkacs; Stephen J. Walder, Jr.; Jeffrey S. LaBaw

(57) ABSTRACT

A mechanism is provided in a data processing system comprising at least one processor and at least one memory, the at least one memory comprising instructions executed by the at least one processor to cause the at least one processor to implement an ontology based persistent attack campaign detection engine. In response to a security incident, the mechanism sends the security incident to an incident model microservice executing within the persistent attack campaign detection engine. The incident model microservice extracts artifacts from the incident, maps the artifacts to a graph topology data structure, and stores the graph topology data structure in a graph data storage. An ontology modeling suite executing within the persistent attack campaign detection engine collects security data from a document data storage, builds a security ontology data structure and storing the security ontology data structure in an ontology data storage, and maps concepts from the security ontology data structure to the graph topology data structure. A custom insight engine executing within the persistent attack campaign detection engine performs insights based on the graph topology data structure and outputs results of the insights to a user in human readable form.

20 Claims, 13 Drawing Sheets

(56) References Cited

U.S. PATENT DOCUMENTS

| | | |
|---|---|---|
| 9,256,739 B1 | 2/2016 | Roundy et al. |
| 9,628,507 B2 | 4/2017 | Haq et al. |
| 9,654,485 B1* | 5/2017 | Neumann ............ H04L 63/1441 |
| 10,521,584 B1* | 12/2019 | Sharifi Mehr ...... H04L 63/1425 |
| 10,673,880 B1* | 6/2020 | Pratt ...................... G06N 20/00 |
| 10,742,667 B1* | 8/2020 | Stern ................... H04L 63/1416 |
| 10,785,239 B2* | 9/2020 | Walsh .................... G06N 5/022 |
| 2006/0212932 A1 | 9/2006 | Patrick et al. |
| 2007/0209074 A1* | 9/2007 | Coffman ............... H04L 63/145 726/23 |
| 2008/0010225 A1 | 1/2008 | Gonsalves et al. |
| 2014/0201836 A1 | 7/2014 | Amsler |
| 2015/0074806 A1* | 3/2015 | Roundy ............. H04L 63/1433 726/23 |
| 2016/0028758 A1* | 1/2016 | Ellis ................... H04L 63/1433 726/25 |
| 2016/0057166 A1 | 2/2016 | Chesla |
| 2016/0072836 A1 | 3/2016 | Hadden et al. |
| 2016/0149938 A1 | 5/2016 | Barak et al. |
| 2016/0205122 A1* | 7/2016 | Bassett ................. G06F 21/577 726/23 |
| 2016/0219066 A1* | 7/2016 | Vasseur ............... H04L 63/1425 |
| 2017/0187742 A1 | 6/2017 | Rogers et al. |
| 2017/0289187 A1* | 10/2017 | Noel ....................... G06F 16/28 |
| 2018/0020023 A1 | 1/2018 | Doron et al. |
| 2018/0159876 A1* | 6/2018 | Park ..................... G06F 16/9024 |
| 2018/0198819 A1* | 7/2018 | Lee ..................... H04L 63/1425 |
| 2018/0205755 A1* | 7/2018 | Kavi ..................... G06F 16/951 |
| 2019/0342307 A1* | 11/2019 | Gamble ............. H04L 63/1416 |
| 2020/0092325 A1* | 3/2020 | Kolingivadi ........ H04L 63/1483 |
| 2020/0099704 A1* | 3/2020 | Lee ..................... H04L 63/1416 |
| 2020/0120118 A1* | 4/2020 | Shu ..................... H04L 63/1425 |
| 2020/0177618 A1* | 6/2020 | Hassanzadeh ........ G06F 21/577 |
| 2020/0280568 A1* | 9/2020 | Bratspiess ........... H04L 63/0876 |

OTHER PUBLICATIONS

Settanni, Giuseppe et al., "A collaborative cyber incident management system for European interconnected critical infrastructures", Journal of Information Security and Applications, vol. 34, Part 2, Jun. 2017, 19 Pages.

* cited by examiner

FIG. 5
PRIMARY INCIDENT ARTIFACTS
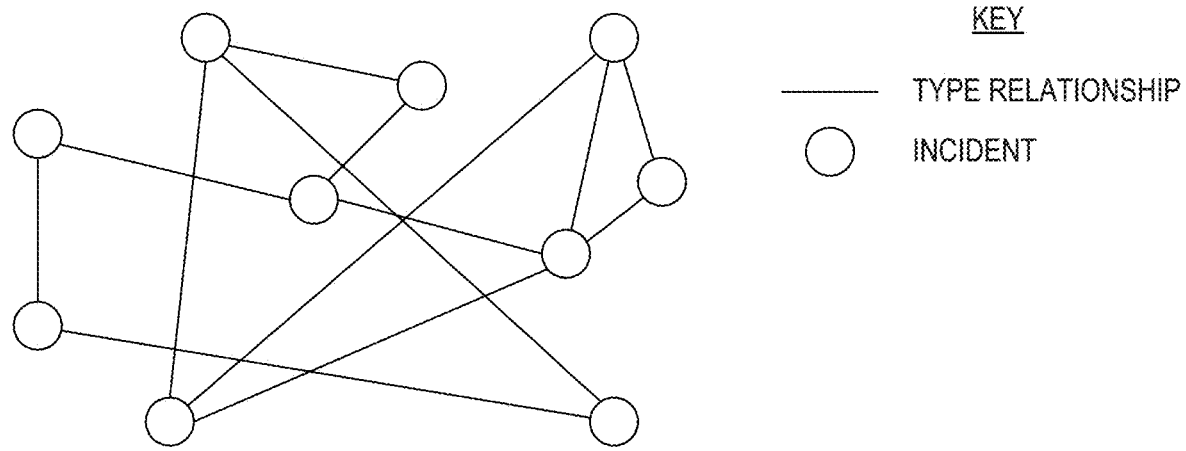
KEY
——— TYPE RELATIONSHIP
○ INCIDENT
TOPOLOGY LAYER TWO – ARTIFACTS LINKED BY OCCURANCE TOGETHER
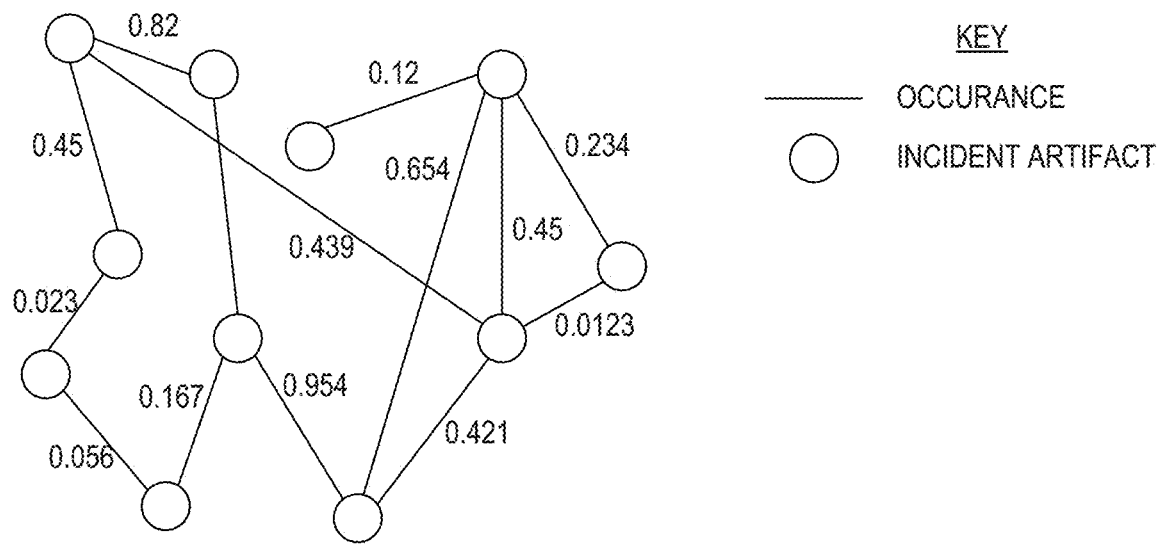
KEY
——— OCCURANCE
○ INCIDENT ARTIFACT

FIG. 7
SECONDARY INCIDENT ARTIFACTS
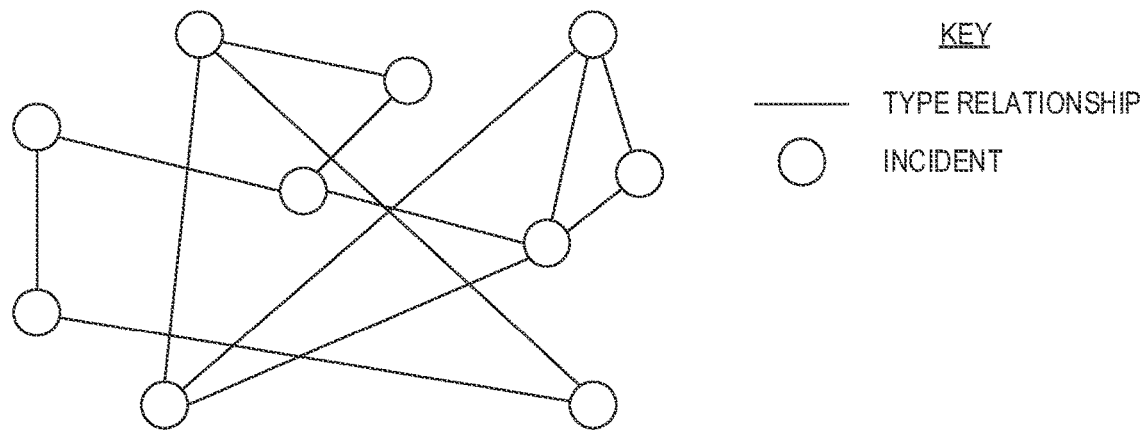
KEY
--------  TYPE RELATIONSHIP
○  INCIDENT
| INFERENCE CONFIDENCE TABLE | |
|---|---|
| ARTIFACT NAME | CONFIDENCE VALUE |
| EVENTCOUNT> 500 | 1.00 |
| HR NETWORK | 0.95 |
TOPOLOGY LAYER TWO – ARTIFACTS LINKED BY OCCURANCE TOGETHER
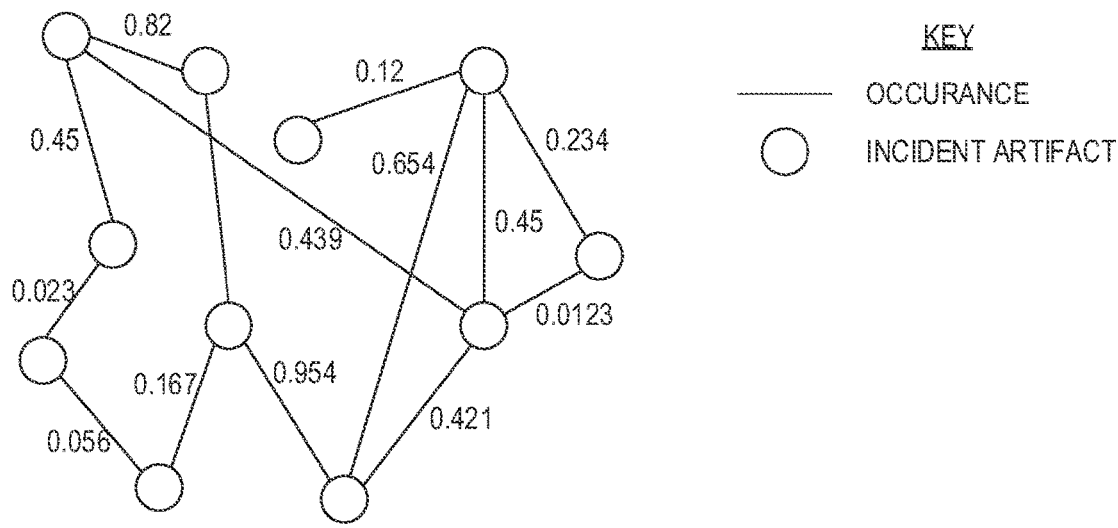
KEY
--------  OCCURANCE
○  INCIDENT ARTIFACT

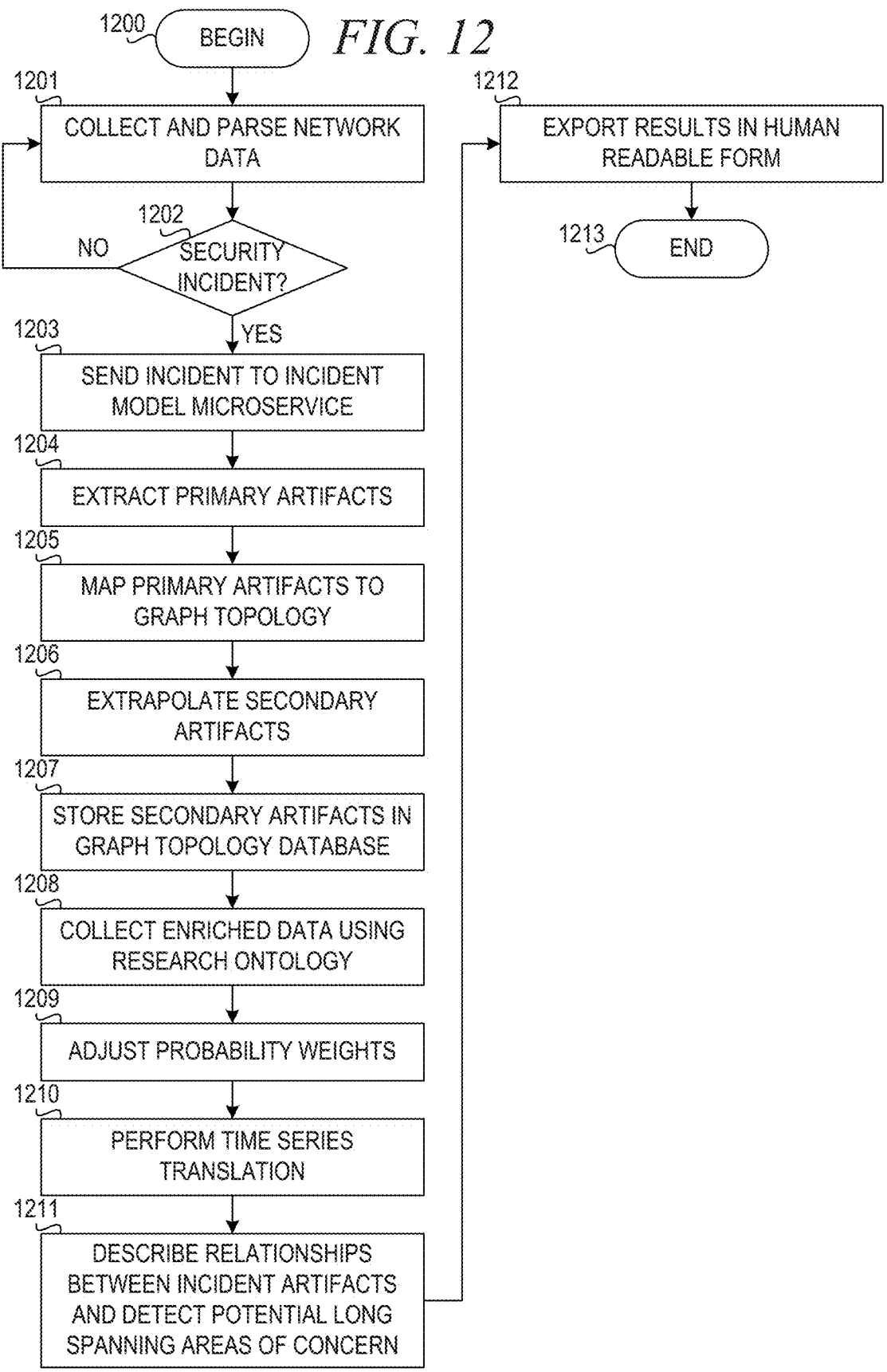

ONTOLOGY BASED PERSISTENT ATTACK CAMPAIGN DETECTION

BACKGROUND

The present application relates generally to an improved data processing apparatus and method and more specifically to mechanisms for ontology based persistent attack campaign detection.

In the field of computer security, security information and event management (SIEM) software products and services combine security information management (SIM) and security event management (SEM), They provide real-time analysis of security alerts generated by applications and network hardware. Vendors sell SIEM as software, appliances, or managed services. These products are also used to log security data and generate reports for compliance purposes. The segment of security management that deals with real-time monitoring, correlation of events, notifications, and console views is known as security event management (SEM). The second area provides long-term storage as well as analysis, manipulation, and reporting of log data and security records of the type collated by SEM software, and is known as security information management (SIM), Organizations are turning to big data platforms to complement SIEM capabilities by extending data storage capacity and analytic flexibility.

The term security information event management (SIEM), encompasses the product capabilities of gathering, analyzing, and presenting information from network and security devices; vulnerability management and policy-compliance tools; operating-system, database, and application logs; and external threat data. A key focus is to monitor and help manage user and service privileges, directory services, and other system-configuration changes, as well as providing log auditing and review and incident response.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system, comprising at least one processor and at least one memory, the at least one memory comprising instructions executed by the at least one processor to cause the at least one processor to implement an ontology based persistent attack campaign detection engine. The method comprises, in response to a security incident, sending the security incident to an incident model microservice executing within the persistent attack campaign detection engine. The method further comprises extracting, by the incident model microservice, artifacts from the incident. The method further comprises mapping, by the incident model microservice, the artifacts to a graph topology data structure. The method further comprises storing, by the incident model microservice, the graph topology data structure in a graph data storage. The method further comprises collecting, by an ontology modeling suite executing within the persistent attack campaign detection engine, security data from a document data storage. The method further comprises building, by the ontology modeling suite, a security ontology data structure and storing the security ontology data structure in an ontology data storage. The method further comprises mapping, by the ontology modeling suite, concepts from the security ontology data structure to the graph topology data structure. The method further comprises performing, by a custom insight engine executing within the persistent attack campaign detection engine, insights based on the graph topology data structure. The method further comprises outputting, by the custom insight engine, results of the insights to a user in human readable form.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 5 illustrates how a graph topology database represents information in accordance with an illustrative embodiment;

FIG. 7 illustrates how a graph topology database represents secondary artifact information in accordance with an illustrative embodiment;

FIG. 12 is a flowchart illustrating operation of a persistent attack campaign detection engine in accordance with an illustrative embodiment;

DETAILED DESCRIPTION

At the heart of an organization's network security infrastructure is a security information and event management (SIEM) product. The SIEM is a security appliance that collects log events, flow data, host vulnerabilities, and network data. After pulling or receiving this network data, a SIEM then parses and normalizes the data. Security analysis writes security rules that analyze the incoming or historical data for potential indications of compromise near real-time. Based on security rules within the SIEM, security incidents are created that alert security administrators of potential security incidents or intrusions.

Most SIEMs do the following:

1. Normalize the incoming data from log sources (computers, firewalls, LDAP servers) and network sources (routers, switches, access points).

2. Correlate the events and network source traffic to security rules.

3. Generate security incidents if the individual elements from the network/log data match the security rules.

4. Send alerts to analysis and allow the incident to be forwarded to the incident response and remediation tool.

Figure 1:
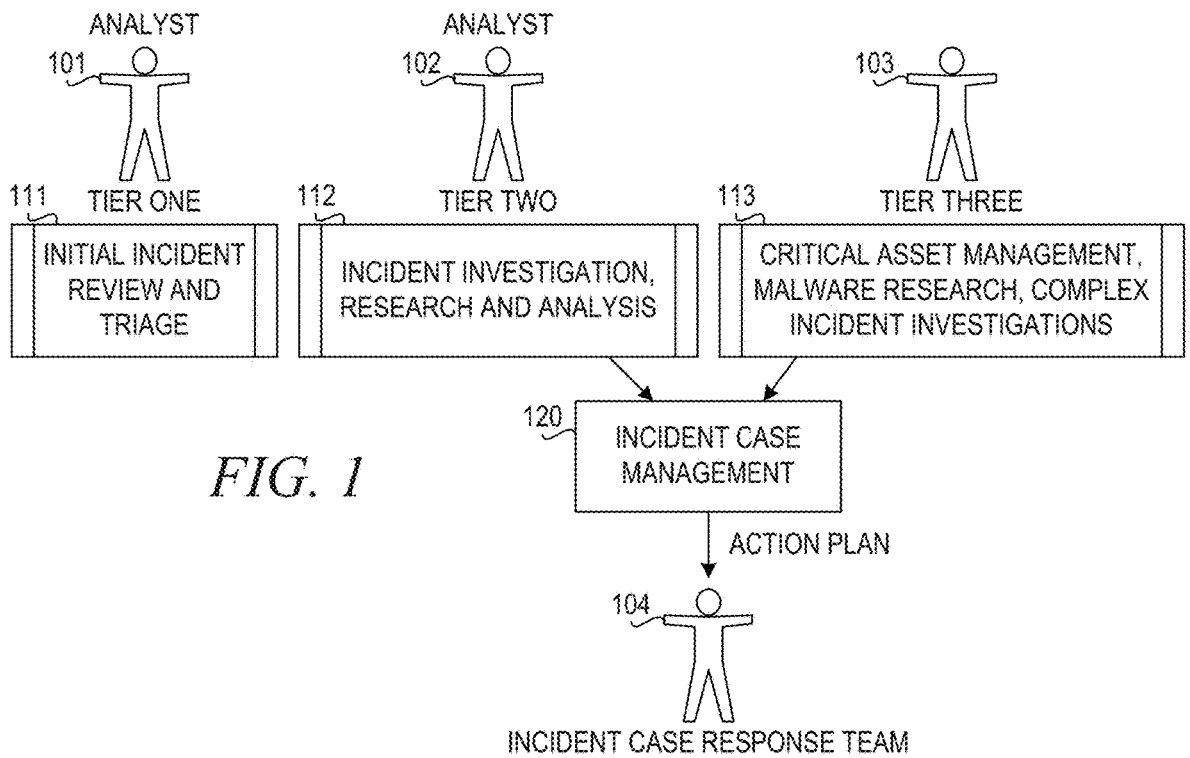
FIG. 1 depicts a current workflow for a typical security analyst.

FIG. 1 depicts a current workflow for a typical security analyst. Most organizations consist of three tiers of security analysists. The first layer analyst 101 performs incident triage and brief research into the attack and asset (block 111). This tier provides a brief summary and shallow investigation in the incident for the next tier.

The second tier analyst 102 is responsible for performing a deep dive into the investigation, performing research on the malware and threats identified, and often correlating the data with threat intelligence sources (block 112). The third layer analyst 103 is sent any incidents that are deemed critical or require heavy research and care remediation. Thus, the third layer analyst 103 performs critical asset management, malware research, and complex incident investigations (block 113). From the second and third tier of analysists, incidents could also be sent to a separate incident response team 104 that handles incident case management and response (block 120). This team is typically in charge of executing an action plan to minimize the impact of the incident, perform tasks required to notify required stakeholders of the breach, and investigate any recurring incidents.

On an average day, a security engineer investigates individual offenses, triages, and sends them to the appropriate response team or manages responses through a tool. The incident response team is then responsible for sandboxing the offending servers or reaching out to assets and users that have been compromised using their response "playbook."

Besides the daily responsibilities of "eyes on glass," security engineers are also expected to provide information to stakeholders about the risk level of their organization's information technology (IT) infrastructure. This is used to help make decisions on which tools and technologies the company may need to invest in and to provide strategic advice on security policies. Stakeholders, such as directors and chief information security officers (CISOs), are looking for the bigger picture than day-to-day operations. They need concrete and actionable conclusions from their SIEM. However, trying to analyze incident patterns and relationships over a long period of time requires time and effort that organizations cannot afford when they are constantly under attack. Most organizations resort to graphical charts and reports that provide limited insight into detecting persistent attack campaigns. An advanced persistent threat (APT) is an attack campaign in which an intruder, or team of intruders, establishes an illicit, long-term presence on a network in order to mine highly sensitive data. Reports only provide a limited summary of what is happening, not how. Most SIEMs perform historical analysis of security data in a limited capacity, relying on correlated indicators of compromise with threat intelligence data. However, security incidents are largely investigated on an individual basis.

In today's market, security attacks are an increasing part of a "crime-as-a-service" model wherein professional Black Hat agents trade information about organization vulnerabilities, malware techniques, and tools. This targeted information is designed to train and assist criminals with what they need to successfully breach an organization. The aim is to evolve the scale and complexity of their attack campaigns by adapting to new challenges and responses in the industry. Every day, these sophisticated threats evolve into new zero-day attacks. Independent industry research points to a dramatic rise in the number of attacks that are persistent, designed to scan and detect weak points in a security infrastructure, which occur over weeks or months rather than minutes or hours.

The challenge is providing long-term strategy suggestions and detecting these persistent campaigns. Current solutions focus on small scale attacks that do not easily scale over time. Compliance is not the same as security, and having a personalized view of the health of an organization's security infrastructure is pivotal. Analysts need a personalized view of their environment so they can quickly respond to changes of asset behavior and deploy customized tools to meet their organizations' unique security goals.

The illustrative embodiments provide a robust and holistic framework that analyzes recurring patterns of behavior or incidents to detect long spanning security issues and weaknesses in the security infrastructure. Thus, the illustrative embodiments provide ontology based persistent attack campaign detection engine. The persistent attack campaign detection engine of the illustrative embodiments considers the following questions:

1. What is the relationship between past security incidents and current incidents? This allows the engine to bind incidents over time using related primary elements.

2. Is this type of attack quite frequent given elements the engine can extract from the incident? This allows the engine to determine whether this is a new attack campaign in this segment of the network or whether this is part of a larger attack pattern that has been recurrent for a period of time.

3. Are there any secondary elements to consider within an incident? For example, seemingly unrelated incidents may share an unknown commonality, such as an attack containing similar virus signatures in a particular network subnet may indicate an outbreak in that location.

4. Are there any data within historical incidents that are indicative of a pattern or trend? This allows the engine to analyze historical attack signatures and elements to assess whether a recurrent pattern is detected in the noise.

The ontology based persistent attack campaign detection engine of the illustrative embodiments is a long duration engine that analyzes all historical security incidents and builds a model that alerts administrators to weak points in the organization's infrastructure and detects new anomalies in the behavior of assets. Most importantly, the engine can also draw from human generated security research data in order to classify recurrent attacks. The engine treats recurrent attacks as a long duration campaign.

Currently, an analyst discards or closes incidents after they have been sent to the incident response team. While utilizing the engine of the illustrative embodiments, the relevant elements from each incident artifact are also automatically forwarded to the proposed long term incident model. Rather than an analyst digging through all the past incidents to build a bigger picture, the model itself performs feature extraction and clustering of the incidents. Primary incident elements or artifacts are first extracted from each incident. The source Internet protocol (IP) address, destination network, ports used, applications used, payload content, and file hashes are examples of primary artifacts that describe the indicator of compromise. At this stage, the persistent attack campaign detection engine also extracts identity information.

Identity information is any incident artifact or indicator that can be used to identify a user or actor of an action. Examples include network IP addresses, usernames, Media Access Control (MAC) addresses, hostnames, or Network Basic Input/Output System (NetBIOS) names. Secondary incident artifacts that may be otherwise overlooked are also examined to determine whether patterns exist in those secondary artifacts as well. This could include data like the network location, data source, location, or time. These elements may not necessarily be an indicator of compromise, but they provide tangential information about the attributes of the incident. These artifacts will be referred to herein as incident metadata.

The illustrative embodiments would determine similarity, temporal, and geographic proximity and correlations to other incidents in the model. Useful security knowledge is then mined from human generated sources and placed in ontology. Allowing the persistent attack campaign detection engine to learn the new terms, techniques, and tools in the security field. After a long term chain of incidents is collected, the model allows administrators to quickly determine which attacks are recurrent based on the nature and identity of top suspect actors by the incident type over time.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that, the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different, type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
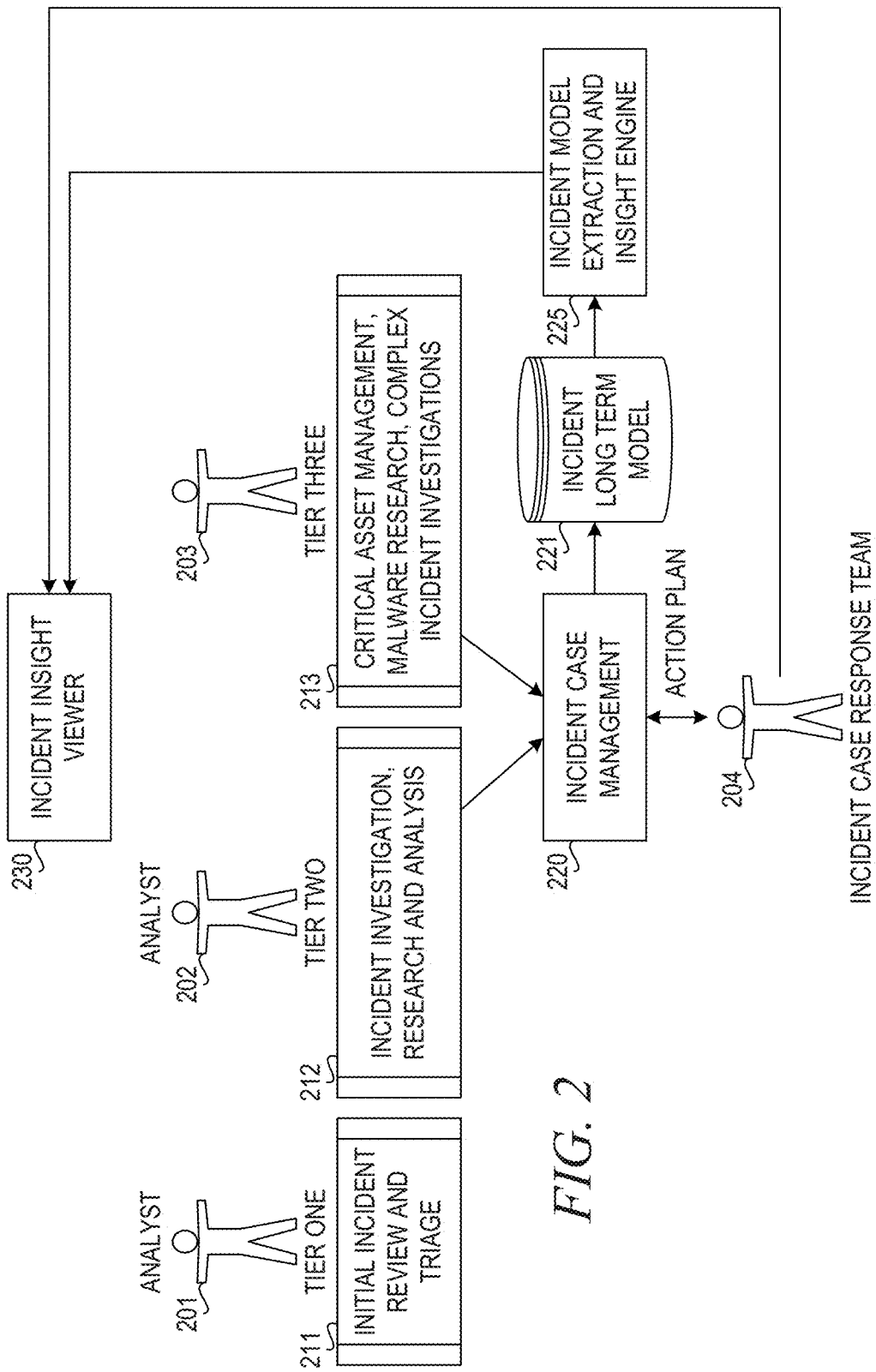
FIG. 2 depicts a workflow for a security analyst using a persistent attack campaign detection engine in accordance with an illustrative embodiment.

FIG. 2 depicts a workflow for a security analyst using a persistent attack campaign detection engine in accordance with an illustrative embodiment. Suppose in a simple case the SIEM has been set to raise an alert when an IP address not within the company's internal network performs a reconnaissance map (nmap) across multiple local destination assets (workstations). This may indicate that a threat actor is scanning the company's workstations for open ports and services, which is usually used to detect vulnerabilities that can be exploited for intrusion. The example scenario lies in the fact that the originating or destination asset's behavior is not tracked anywhere past this single incident. As such, a security analyst has no way of understanding this behavior on the organization's entire network environment. The analyst does not consider whether it is the first known type of attack for this asset, whether the location of the asset is persistent, what the asset's past behavior has been thus far, whether the attacker is known, or how the actor has acted in the past.

The first layer analyst 201 performs incident triage and brief research into the attack and asset (block 211). This tier provides a brief summary and shallow investigation in the incident for the next tier. The second tier analyst 202 is responsible for performing a deep dive into the investigation, performing research on the malware and threats identified, and often correlating the data with threat intelligence sources (block 212). The third layer analyst 203 is sent any incidents that are deemed critical or require heavy research and care remediation. Thus, the third layer analyst 203 performs critical asset management, malware research, and complex incident investigations (block 213). From the second and third tier of analysts, incidents could also be sent to a separate incident response team 204 that handles incident case management and response (block 220). This team is typically in charge of executing an action plan to minimize the impact of the incident, perform tasks required to notify required stakeholders of the breach, and investigate any recurring incidents.

The persistent attack campaign detection engine of FIG. 2 works in multiple stages.

Stage 1: Incident Sent to Model Running as a Microservice

When an incident is being triaged or investigated by a security analyst, the analyst is given the choice to send the incident to the historical incident long-term model 221. In one embodiment, the data are sent to the persistent attack campaign detection engine through a secure RESTful Application Programming Interface (API), In one embodiment, the persistent attack campaign detection engine runs in the cloud as a microservice container based solution, or alternatively the persistent attack campaign detection engine is deployed locally within an organization's network perimeter. This flexibility allows the persistent attack campaign detection engine to be deployed through any SIEM and allow cross platform integrations, as it is common to have more than one SIEM or log management tool, such as incident case management 220, in an organization. Rather than hosting the persistent attack campaign detection engine on one SIEM, the data could be sent to a cloud service or kept locally, by having a local instance, for those with strict data regulation policies.

Figure 3:
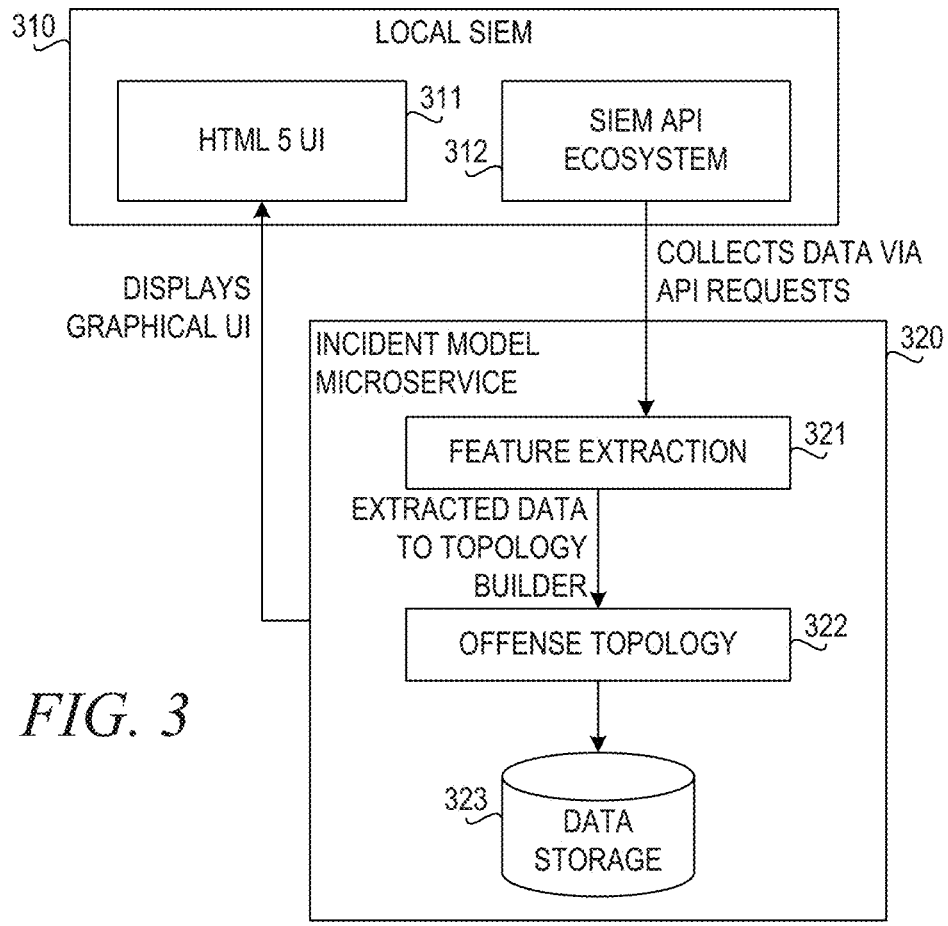
FIG. 3 is a block diagram of a persistent attack campaign detection engine implemented as a microservice in accordance with an illustrative embodiment.

FIG. 3 is a block diagram of a persistent attack campaign detection engine implemented as a microservice in accordance with an illustrative embodiment. Local SIEM 310 includes Hypertext Markup Language (HTML) 5 user interface (UI) 311 and SIEM API ecosystem 312. Incident model microservice 320 includes feature extraction component 321, offense topology builder 322 and data storage 323. Feature extraction component 321 collects data from local SIEM 310 via API requests. Feature extraction component 321 sends extracted data to the topology builder 322, which builds an offense topology and stores the topology in data storage 323. Incident model microservice 320 then displays the offense topology, extracted data, etc. via a graphical user interface using HTML 5 UI 311.

In the graph topology shown in FIGS. 5 and 7 the primary and secondary incident elements have been mapped out and stored into a non-relational graph database. The various weights shown in the graphs would be represented as a property of an edge in the database. Each property in the graph would contain the data value, the name, and type, which indicates the type of data the property, is meant to represent.

Stage 2: Parse Primary Incident Artifacts and Store in Graph Topology Database

Figure 4:
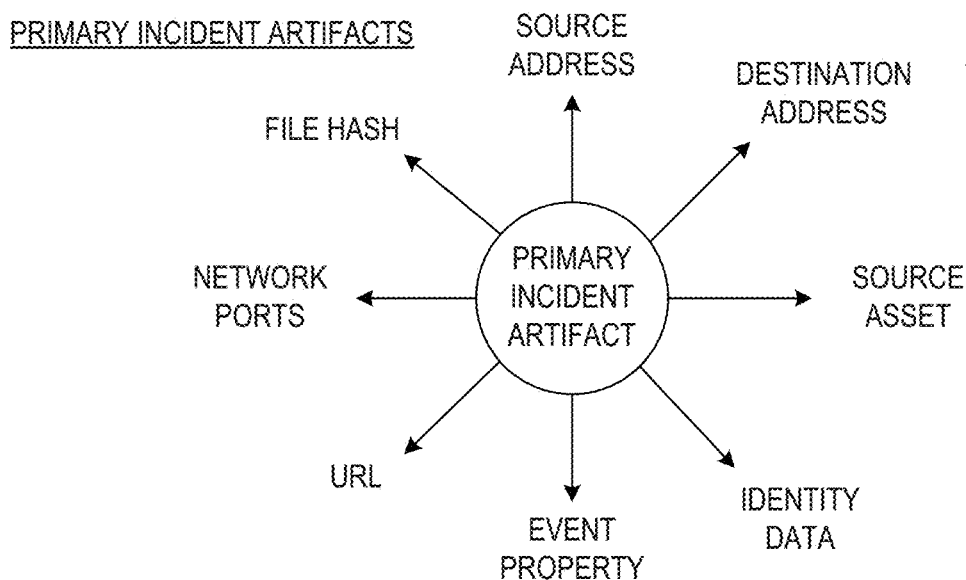
FIG. 4 illustrates primary incident artifacts that can be extracted from an incident in accordance with an illustrative embodiment.

Returning to FIG. 2, at this stage, the persistent attack campaign detection engine extracts pertinent vectors, indicators of compromise, and primary artifacts among all incidents over time (block 225). This information is assumed to be readily available from the data extracted from the SIEM. That is, incident artifacts (i.e., elements) that are known to exist in an incident through information provided by the SIEM regarding which artifacts directly created or caused the incident. This includes items such as Uniform Resource Locators (URLs), file hashes, IP addresses, identity information, payloads, and stack traces. These are all indicators of compromise that exist in more than one security incident. FIG. 4 illustrates primary incident artifacts that can be extracted from an incident in accordance with an illustrative embodiment.

Linkages drawn are mapped to a graph topology, which enables the persistent attack campaign detection engine to easily explore relationships between nodes and to traverse the graph from any nodes to find related artifacts based on a particular query parameter. For the sake of simplicity, assume the graph contains multiple layers where each layer describes relationships that exist between the nodes.

FIG. 5 illustrates how a graph topology database represents information in accordance with an illustrative embodiment. The first layer contains incidents and linkages between them by type. For a given node in the graph, the engine can find other incidents that share the type of artifact (identified by the solid line from one node to another). This example is simplified. In reality, the graph could potentially contain millions of nodes and billions of links.

The second layer contains mapping between incident artifacts and the probability that they are correlated together. The second layer represents a weighted graph where each link contains the likelihood of one element occurring with another. This allows the persistent attack campaign detection engine to quickly lookup types known to be strongly correlated with each other. At a later stage, the relationships between artifacts may be strengthened or weakened to fit the model as more data are accumulated.

Figure 6:
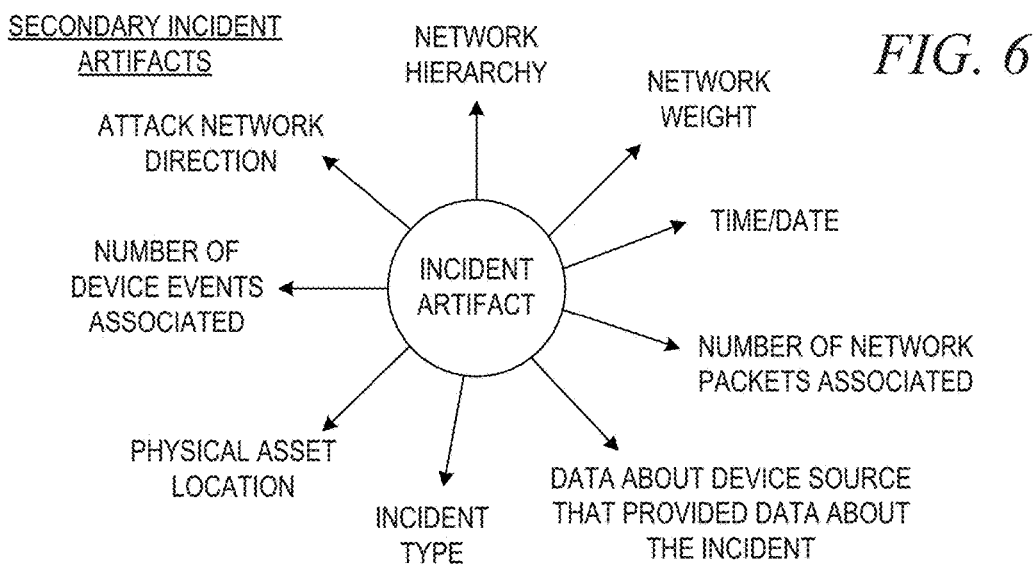
FIG. 6 illustrates secondary incident artifacts that can be extracted from an incident in accordance with an illustrative embodiment.

Stage 3: Extrapolate Secondary Incident Artifacts and Store in Graph Topology Database Returning to FIG. 2, some incident artifacts do not necessarily contain data about an indicator of compromise but provide metadata about the incident or asset in question. For example, there may be three incidents that seem disjointed but were all brute three Secure Shell (SSH) attacks (primary artifact), originating from a particular network segment used by the Human Resources (HR) department (secondary artifact) occurring at roughly 8:00 AM each time (secondary artifact). This kind of metadata is not typically kept within threat intelligence sources or extracted to be correlated by most incident response frameworks. However, they provide useful metadata about the attack type that allows the persistent attack campaign detection engine to track incident patterns using meta incident data and to link these attributes. FIG. 6 illustrates secondary incident artifacts that can be extracted from an incident in accordance with an illustrative embodiment. These data also allow the persistent attack campaign detection engine to provide specialized feedback to the organization based on specific patterns or anomalies in the entire infrastructure (e.g., specific time periods, network objects, geographic regions, and attack biases) that would normally be missed by a SIEM providing only threat/malware analysis and feedback. Thus, the persistent attack campaign detection engine also extracts secondary artifacts in block 225. Knowledge of the data source providing information about the attack can be integrated into the overview of the persistent attack campaign detection engine.

Note that an incident artifact is represented using mathematical notations within the persistent attack campaign detection engine. For example, an event that occurs at 8:00 AM could be written as:

$$P(I, 08:00+-30)=0.95$$

This means that an incident "I" began between 8:00 AM plus or minus 30 minutes with a 95% probability. There is a strong likelihood that the event happened within this time interval. This kind of notation is both concise and powerful in that it allows the persistent attack campaign detection engine to make exploratory descriptions of the artifacts in a way that can be easily fitted into a probabilistic inference framework. As with the previous case with primary incident artifacts, linkages between the various secondary artifacts would need to be determined. Some of these data are not automatically provided by the SIEM. In accordance with an illustrative embodiment, the persistent attack campaign detection engine performs probabilistic inferences of some data and presents the inferences in incident insight viewer 230.

For example, in order to assess the credibility of the data source that contained the data used to create the incident, the persistent attack campaign detection engine accesses the prior history of that data source. The persistent attack campaign detection engine then examines the number of incidents created from that source, compared to the number of false positives as well as any confidence measure the SIEM has provided about the data source.

FIG. 7 illustrates how a graph topology database represents secondary artifact information in accordance with an illustrative embodiment. In order to determine the geographic regions affected, the persistent attack campaign detection engine queries a global Geographic Information System (GIS) database for IP address to geo-coordinate conversion. The confidence of the new data is encapsulated by an Inference Confidence Table. This table consists of a numeric value indicating the confidence that the secondary artifact extracted is correct. In terms of the graph database, unlike the prior primary artifact graph of FIG. 5, the nodes in layer one of the graph of FIG. 7 would be the artifacts themselves, and the lines would be the incidents. Therefore, incidents are linked that have the same originating meta-artifact. The second layer represents how certain that an incident artifact (e.g., a network location) occurs alongside another artifact (e.g., a network). This is represented as a weighted graph where each link represents the likelihood that one element occurs with another. High probabilities allow the framework to learn that the two artifacts are strongly correlated. At a later stage, the relationships between artifacts may be strengthened or weakened as more data are accumulated to fit the model.

As with primary incident artifact extraction, note that the diagram in FIG. 7 is an extremely simplified example. The actual graph may comprise millions of nodes and billions of connections.

Step 4: Enriched Data are Collected by the Model Using Research Ontology

Figure 8:
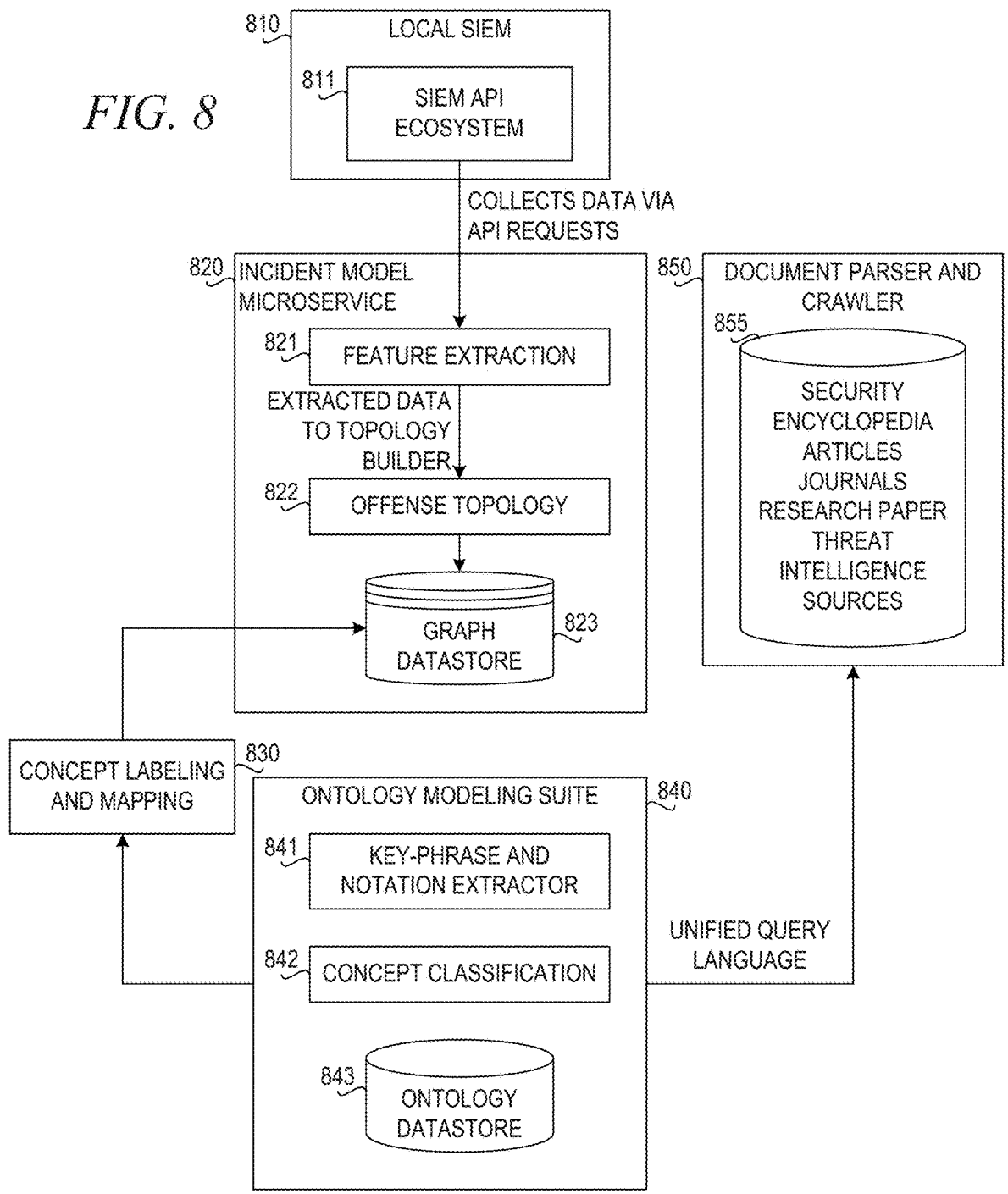
FIG. 8 is a block diagram of an ontology based persistent attack campaign detection engine with an ontology modeling suite in accordance with an illustrative embodiment.

FIG. 8 is a block diagram of an ontology based persistent attack campaign detection engine with an ontology modeling suite in accordance with an illustrative embodiment. Local SIEM 810 includes SIEM API ecosystem 811. Incident model microservice 820 includes feature extraction component 821, offense topology builder 822 and data storage 823. Feature extraction component 821 collects data from local SIEM 810 via API requests. Feature extraction component 821 sends extracted data to the topology builder 822, which builds an offense topology and stores the topology in data storage 823.

Collection of enriched data is done in two stages. First, a document parser and classifier collect security data from the Web which are assumed to be human readable only or partially machine readable. Then ontology modeling suite 840 creates a formal ontology to provide formal naming, classification, and definition of the types, properties, and entities that exist in the security domain created by document parser and crawler 850.

Document parser: The document parser/crawler 850 is essentially a Web crawler/scraper that traverses the Internet (using various crawling and back propagation algorithms) and collects various security related documents, such as news bulletins and research reports, threat intelligence artifacts, and malware research databases. The document parser/crawler 850 records and organizes the data in data store 855. The data in data store 855 may include security encyclopedia articles, journals, research papers, and threat intelligence sources. The document parser also determines the rank of the documents based on the citations, links from and to the document, and the confidence in the source of the document.

In ontology modeling suite 840, a unified query language is used to interact with the document parser and crawler 850 to build a formal ontology of these facts. This ontology is an automated classifier and query database. Key phrase and notation extractor 841 extracts notations and labeling metadata from the document data store 855. Concept classification component 842 classifies key word phrases, notations, and symbols with their associated security concepts to describe any class of threat or malware artifact. Note that machine learning algorithms may be employed to enhance the results. The keywords and naming are normalized to closely match what is captured in the graph topology scheme.

After the ontology is built, an attempt is made to map the tuples in the graph to these entities (block 830). Using the keywords and classification layers in the ontology allows the persistent attack campaign detection engine to map known malware and threat concepts, attack patterns and signatures to the entities in the topology, which closely resembles that classification. This enriches existing topology data with human readable security notations in ontology data store 843.

Step 5: Probability Weight Adjustments

The persistent attack campaign detection engine must intelligently distinguish between weakly linked relations and those with stronger associations. For example, if ten incidents of the same type are found that have the same user name and log source, the correlation weight of this association is increased due to the similarity of the incident type and the presence of identity data. This kind of relationship is increased due to the similarity of the incident type and the presence of identity data. This kind of relationship is annotated so it is easily presented back to the user. Based on the correlation factor, the persistent attack campaign detection engine would increase or decrease the visibility of this relationship to the user. This is done to limit the amount of "noise" sent back to the user in the charts. Within each of the graph topology probabilistic networks (the second layer graph in stages 3 and 4), a decay factor is employed to weaken relationships as required to reduce the level of noise and overfitting in the graph. Then a multiplier factor is applied to enhance relationships that are considered to be strongly correlated.

Step 6: Time Series Translation

Figure 9:
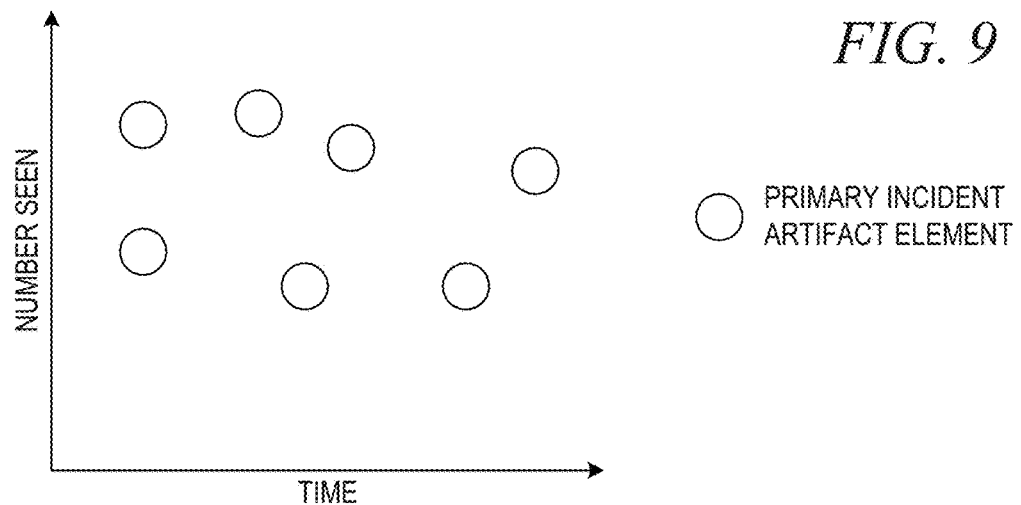
FIG. 9 illustrates an example time series data plot for primary incident artifact elements in accordance with an illustrative embodiment

Once the enhanced graphs are being created and the probabilities adjusted, the persistent attack campaign detection engine pulls all the relevant enriched incident artifacts and maps them onto a time series map. Each element will be paired with the data with which it occurred. This allows the persistent attack campaign engine to determine the frequency of the incident artifact elements. The enriched data from the built ontology would allow the persistent attack campaign detection engine to label new attack signatures with the most current description available from the enriched sources. FIG. 9 illustrates an example time series data plot for primary incident artifact elements in accordance with an illustrative embodiment. For incident metadata, the time series data plot would be similar to the data plot of FIG. 9 but each element would contain the assessed confidence in each metadata tuple. This would allow the persistent attack campaign detection engine to quickly query this map for all incidents above a certain confidence threshold between certain dates.

Step 7: Insight Engine

Figure 10:
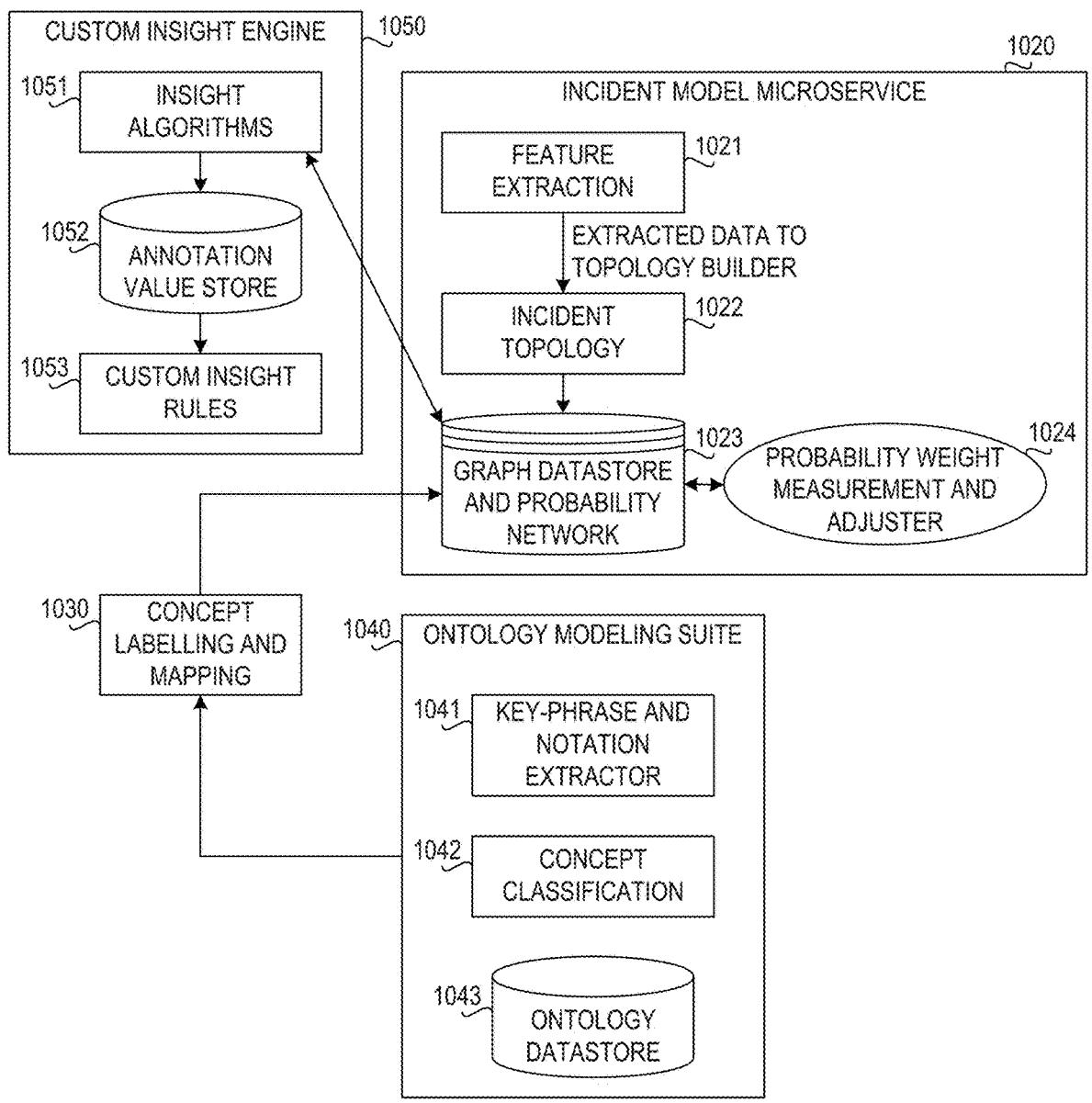
FIG. 10 is a block diagram of an ontology based persistent attack campaign detection engine with a custom insight engine in accordance with an illustrative embodiment.

FIG. 10 is a block diagram of an ontology based persistent attack campaign detection engine with a custom insight engine in accordance with an illustrative embodiment. Incident model microservice 1020 includes feature extraction component 1021, offense topology builder 1022, and data storage 1023. Feature extraction component 1021 collects data from the SIEM. Feature extraction component 1021 sends extracted data to the topology builder 1022, which builds an offense topology and stores the topology in data storage 1023.

Collection of enriched data is done in two stages. First, a document parser and classifier collect security data from the Web which are assumed to be human readable only or partially machine readable. Then, ontology modeling suite 1040 creates a formal ontology to provide formal naming, classification, and definition of the types, properties, and entities that exist in the security domain.

In ontology modeling suite 1040, key phrase and notation extractor 1041 extracts notations and labeling metadata from the document data store. Concept classification component 1042 classifies key word phrases, notations, and symbols with their associated security concepts to describe any class of threat or malware artifact.

After the ontology is built, an attempt is made to map the tuples in the graph to these entities (block 1030). Using the keywords and classification layers in the ontology allows the persistent attack campaign detection engine to map known malware and threat concepts, attack patterns and signatures to the entities in the topology, which closely resembles that classification. This enriches existing topology data with human readable security notations in ontology data store 1043.

The aim of the persistent attack campaign detection engine is to describe relationships between incident artifacts (primary and secondary) as well as to detect potential long spanning areas of concern. The inference engine 1050 sits above the entire framework and constantly queries the graph data store 1023, which contains the enhanced incident relation mapping, Insight algorithms 1051 queries graph data store and probability network 1023. Probability weight measurement and adjuster 1024 examines patterns in this layer using probabilistic inference from the probability network in the graph topology. The persistent attack campaign detection engine uses the probability of network artifacts occurring together along with the known history of incidents being related to those artifacts to produce several annotations. In particular, the end user would want to know the following:

1. Which secondary artifacts are indicators of known long-duration attack campaigns?
2. Which assets seem to be frequently at risk and which secondary artifacts are strong indicators of compromise?
3. Are there any anomalies in the risk calculations of any tuple contained in the database (deviations from historical norms)?

Insight algorithms 1051 store results of querying the graph data store 1023 in annotation value store 1052. Custom insight rules 1053 give end users the ability to write rules that govern how the custom insight engine 1050 makes inferences based on specific criteria set by the user.

Figure 11:
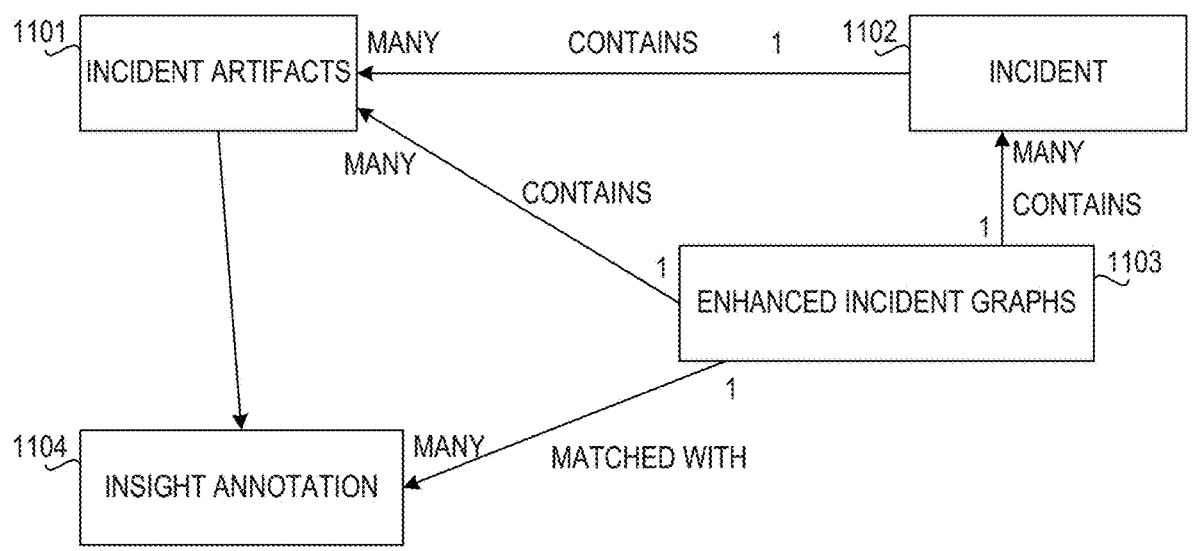
FIG. 11 illustrates example rules that govern how an insight engine makes inferences in accordance with an illustrative embodiment.

FIG. 11 illustrates example rules that govern how an insight engine makes inferences in accordance with an illustrative embodiment. According to the rules depicted in FIG. 11, one incident 1102 may contain many incident artifacts 1101. One enhanced incident graph 1103 may contain many incidents 1102 and may contain many incident artifacts. One enhanced incident graph 1103 may be matched with many insight annotations, And, each insight annotation 1104 may access incident artifacts 1101.

Step 8: Query Framework and Presentation Considerations

A significant amount of effort expended by security engineers is aimed at digging into past incidents and trying to build a story about how these attacks are affecting the organization's security integrity. When the data is presented, the persistent attack campaign detection engine provides a means for the data gathered to be queried using a unified query language, as well as plugins to allow the results to be exported in human readable form or rendered within a Web page. The persistent attack campaign detection engine is designed to be flexible in the manner in which data can be retrieved from the insight engine and presented to the end user. The aim is to allow the analyst to query the persistent attack campaign detection engine for insights either relating to any incident artifact (primary or metadata) and to receive insights into that artifact. Another goal is to provide analysts with the ability to query the framework for deviations in the long term pattern of attacks, high risk assets/networks, and any suspected long term attack campaign. Plugins for the persistent attack campaign detection engine allow integration directly into a SIEM product and method to share insights anonymously with other organizations through a public security bulletin.

The present invention may be a system, a method, and/or a computer program product. The computer program product may include a computer readable storage medium (or media) having computer readable program instructions thereon for causing a processor to early out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 12 is a flowchart illustrating operation of a persistent attack campaign detection engine in accordance with an illustrative embodiment. Operation begins (block 1200), and the persistent attack campaign detection engine collects and parses network data (block 1201). The persistent attack campaign detection engine determines whether a security incident is detected (bock 1202). If a security incident is not detected, then operation returns to block 1201 until a security incident is detected.

If a security incident is detected in block 1202, then the persistent attack campaign detection engine sends the incident to an incident model microservice within the persistent attack campaign detection engine (block 1203). The incident model microservice extracts primary artifacts (block 1204) and maps the primary artifacts to a graph topology (block 1205). The incident model microservice also extrapolates secondary artifacts (block 1206) and stores the secondary artifacts in the graph topology database (block 1207).

The persistent attack campaign detection engine then collects enriched data using research ontology (block 1208). The persistent attack campaign detection engine adjusts probability weights (block 1209). Then, the persistent attack campaign detection engine performs time series translation (block 1210).

An insight engine within the persistent attack campaign detection engine describes relationships between incident artifacts and detects potential long spanning areas of concern (block 1211) and exports results in human readable form (block 1212). Thereafter, operation ends (block 1213).

Figure 13:
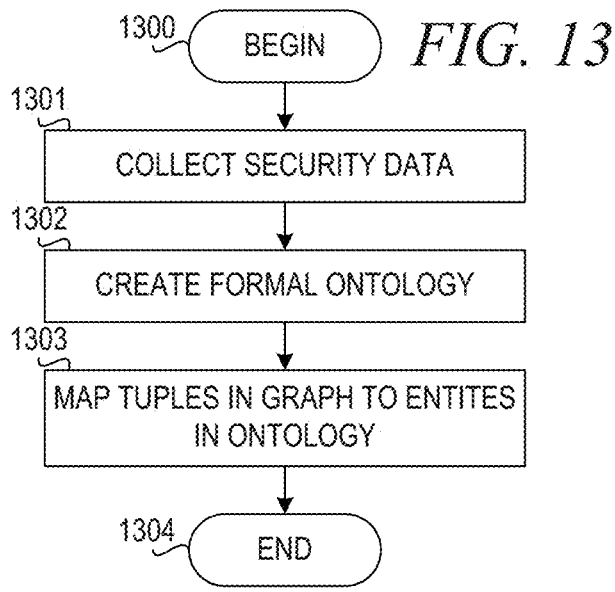
FIG. 13 is a flowchart illustrating operation of an ontology modeling suite in accordance with an illustrative embodiment.

FIG. 13 is a flowchart illustrating operation of an ontology modeling suite in accordance with an illustrative embodiment. Operation begins (block 1300), and the ontology modeling suite collects security data (block 1301). The ontology modeling suite creates a formal ontology (block 1302) and maps tuples in the graph to entities in the ontology (block 1303). Thereafter, operation ends (block 1304).

Figure 14:
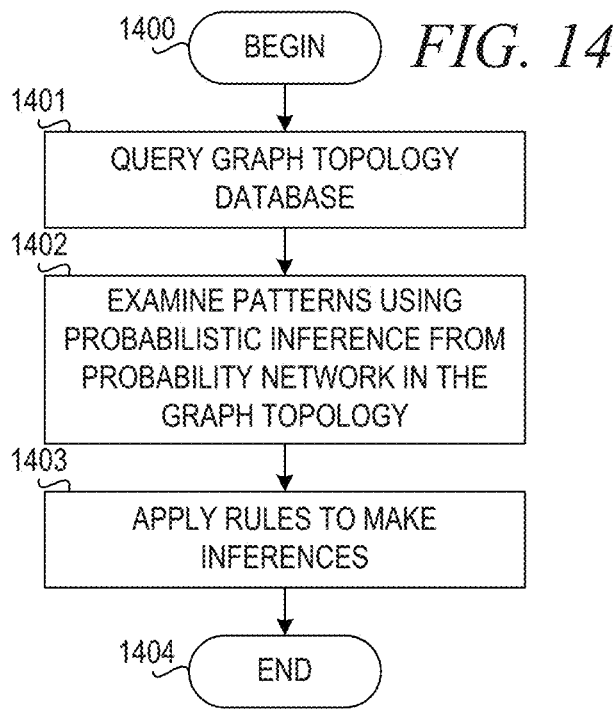
FIG. 14 is a flowchart illustrating operation of a custom insight engine in accordance with an illustrative embodiment.

FIG. 14 is a flowchart, illustrating operation of a custom insight engine in accordance with an illustrative embodiment. Operation begins (block 1400), and the custom insight engine queries the graph topology database (block 1401). The custom insight engine then examines patterns using probabilistic inference from the probability network in the graph topology (block 1402). The custom insight engine then applies rules to make inferences (block 1403). Thereafter, operation ends (block 1404).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter)).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 15:
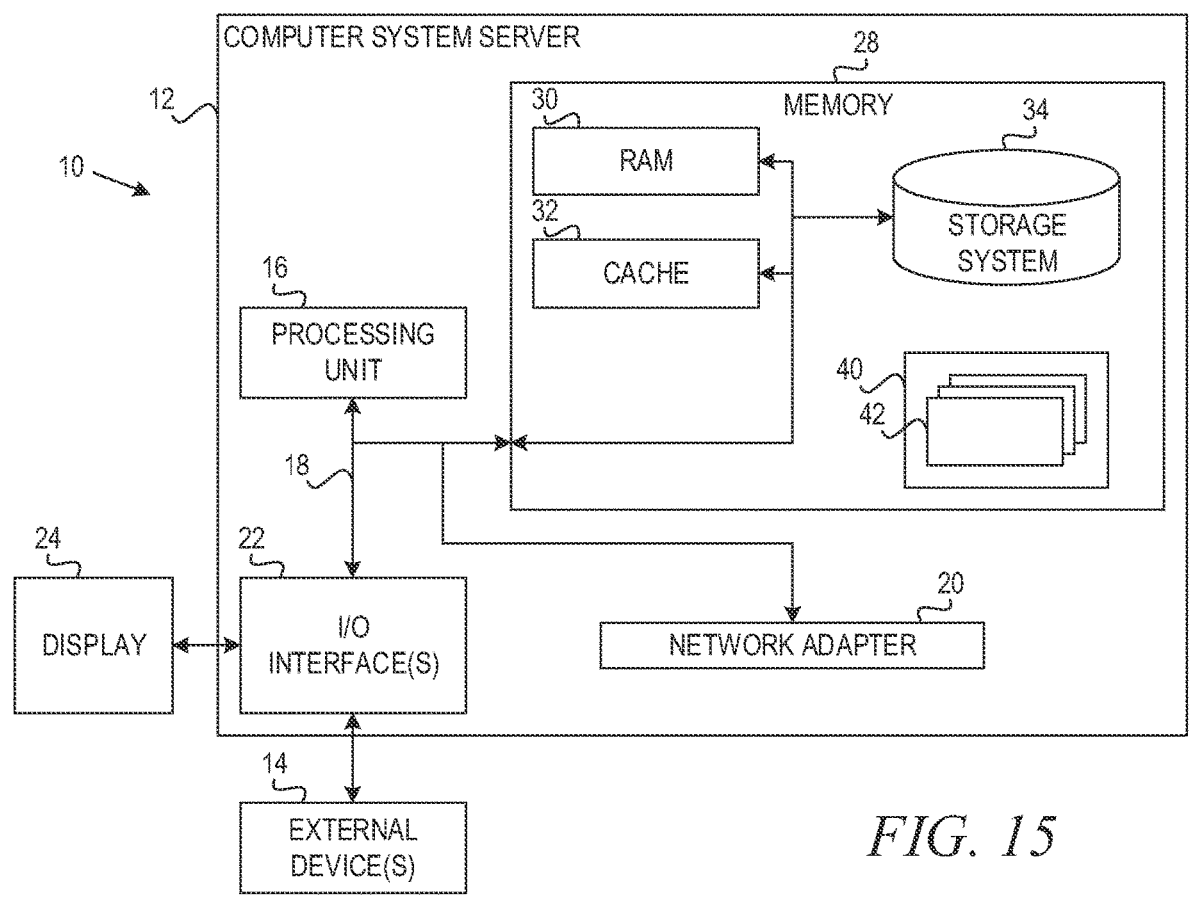
FIG. 15 depicts a cloud computing node according to an illustrative embodiment.

Referring now to FIG. 15, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 16:
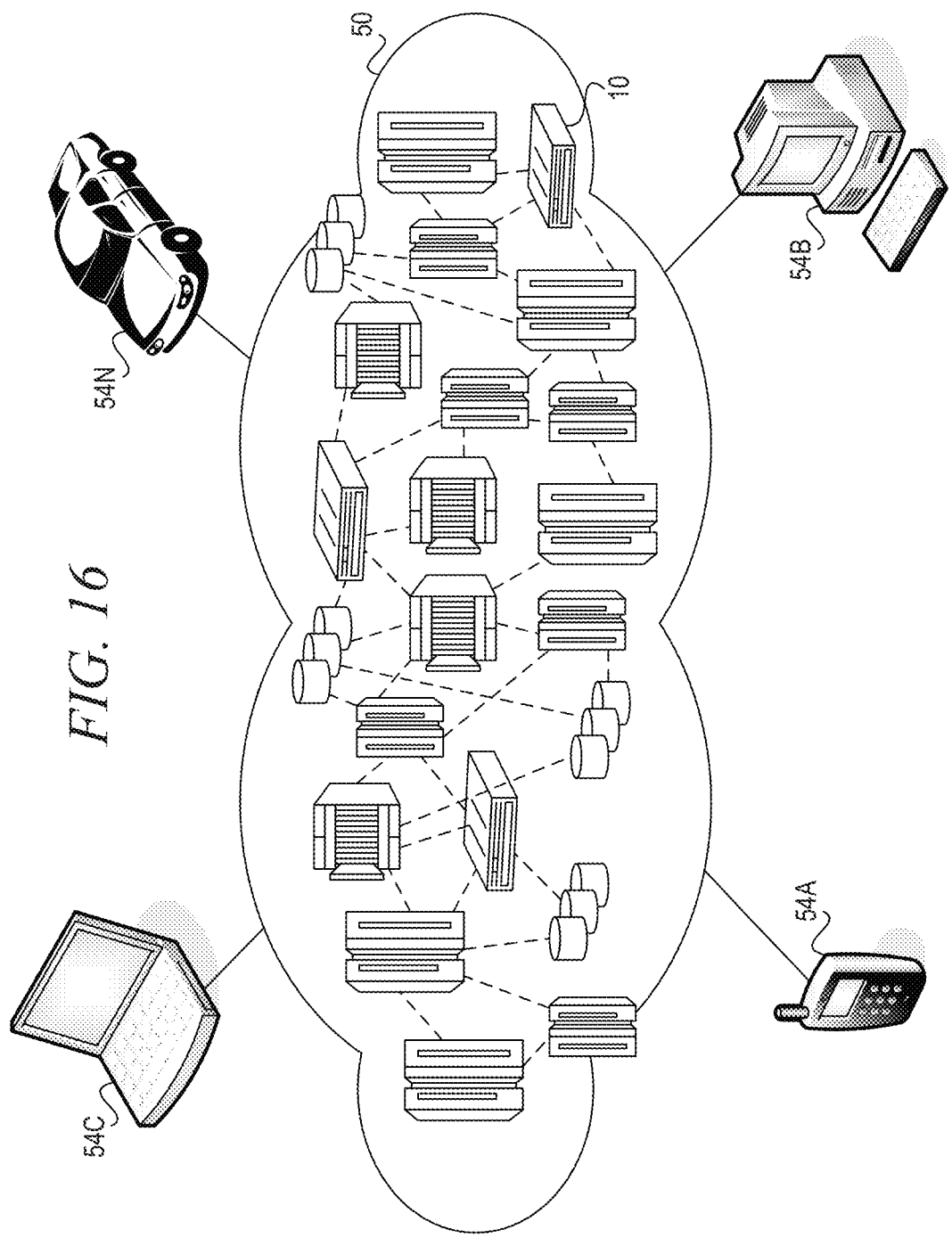
FIG. 16 depicts a cloud computing environment according an illustrative embodiment.

Referring now to FIG. 16, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
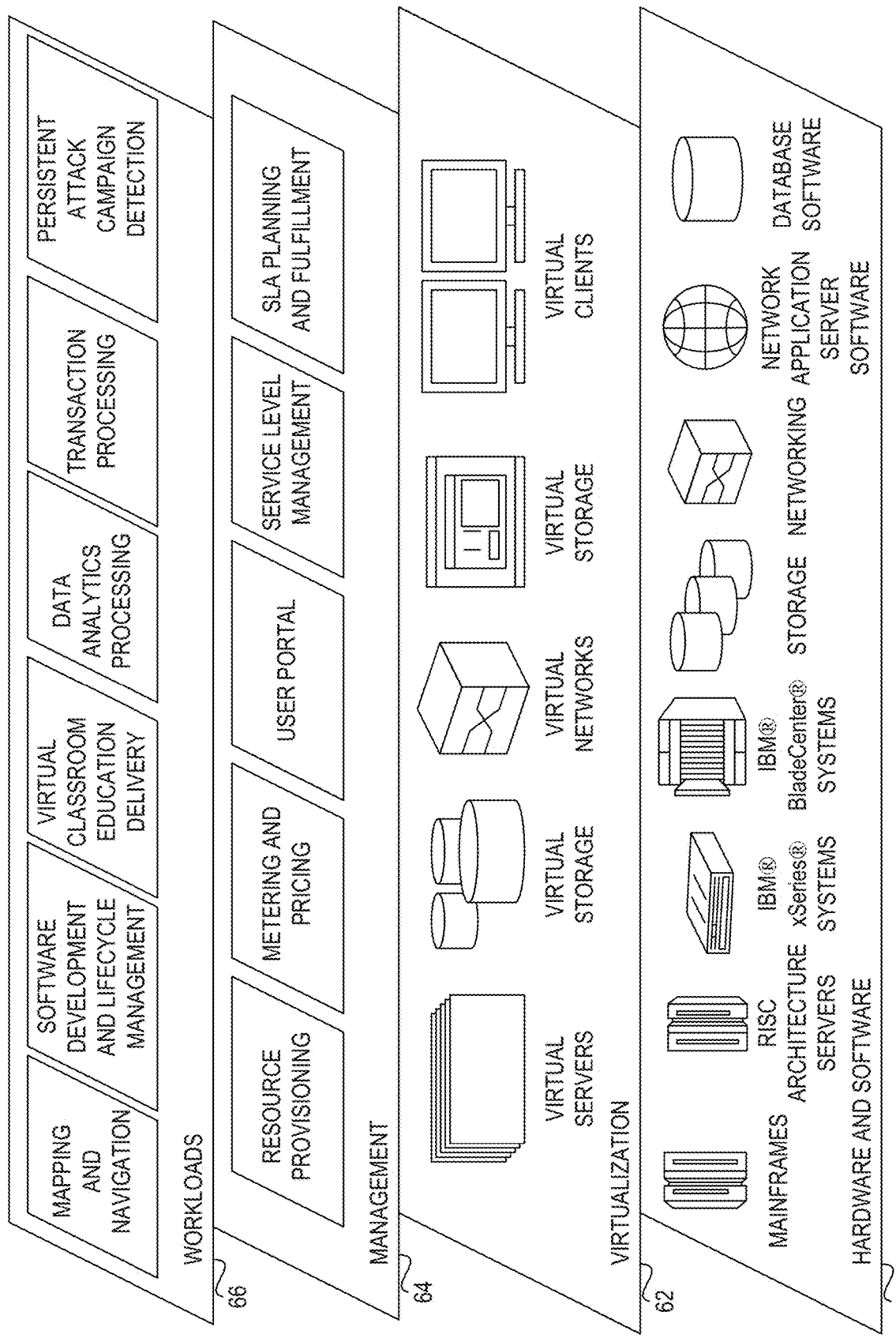
FIG. 17 depicts abstraction model layers according to an illustrative embodiment.

Referring now to FIG. 17, a set of functional abstraction layers provided by cloud computing environment 50 (FIG. 2) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of international Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below, Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and persistent attack campaign detection. The ontology based persistent attack campaign detection engine of the illustrative embodiments is a long duration engine that analyzes all historical security incidents and builds a model that alerts administrators to weak points in the organization's infrastructure and detects new anomalies in the behavior of assets. Most importantly, the engine can also draw from human generated security research data in order to classify recurrent attacks. The engine treats recurrent attacks as a long duration campaign.

The illustrative embodiments would determine similarity, temporal, and geographic proximity and correlations to other incidents in the model. Useful security knowledge is then mined from human generated sources and placed in ontology. Allowing the persistent attack campaign detection engine to learn the new terms, techniques, and tools in the security field. After a long term chain of incidents is collected, the model allows administrators to quickly determine which attacks are recurrent based on the nature and identity of top suspect actors by the incident type over time.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising at least one processor and at least one memory, the at least one memory comprising instructions executed by the at least one processor to cause the at least one processor to implement an ontology based persistent attack campaign detection engine, the method comprising:

in response to a security incident, sending the security incident to an incident model microservice executing within the persistent attack campaign detection engine;

extracting, by the incident model microservice, artifacts from the incident;
mapping, by the incident model microservice, the artifacts to a graph topology data structure, wherein the graph topology data structure comprises a two-layer graph topology, wherein a first layer contains incidents and linkages between the incidents by type and wherein the second layer contains mappings between incident artifacts and probabilities that the incident artifacts are correlated together;
storing, by the incident model microservice, the graph topology data structure in a graph data storage;
collecting, by an ontology modeling suite executing within the persistent attack campaign detection engine, security data from a document data storage;
building, by the ontology modeling suite, a security ontology data structure and storing the security ontology data structure in an ontology data storage;
mapping, by the ontology modeling suite, concepts from the security ontology data structure to the graph topology data structure;
performing, by a custom insight engine executing within the persistent attack campaign detection engine, insights based on the graph topology data structure; and
outputting, by the custom insight engine, results of the insights to a user in human readable form.

2. The method of claim 1, wherein extracting artifacts from the incident comprises extracting primary incident artifacts that describe an indicator of compromise.

3. The method of claim 1, wherein extracting artifacts from the incident comprises collecting the artifacts from a security information and event management (SIEM) application programming interface (API) ecosystem via API requests.

4. The method of claim 1, further comprising adjusting probability weights in the two-layer graph topology.

5. The method of claim 1, wherein building the security ontology data structure comprises using a unified query language to interact with a document parser and a crawler to build a formal ontology.

6. The method of claim 1, wherein building the security ontology data structure comprises:
extracting notations and labeling metadata from a document data store;
classifying key word phrases, notations, and symbols with associated security concepts to describe any class of threat or malware artifact; and
normalizing the key word phrases, notations, and symbols to match what is captured in the graph topology data structure.

7. The method of claim 1, wherein extracting artifacts from the incident comprises extracting secondary incident artifacts that provide metadata about an incident or asset in question.

8. The method of claim 1, wherein performing insights based on the graph topology data structure comprises:
querying the graph topology data structure:
examining patterns using probability inference from a probability network in the graph topology data structure; and
applying user generated custom insight rules to the patterns.

9. A computer program product comprising a computer readable storage medium having a computer readable program stored therein, wherein the computer readable program, when executed on a computing device, causes the computing device to implement an ontology based persistent attack campaign detection engine, wherein the computer readable program causes the computing device to:
in response to a security incident, send the security incident to an incident model microservice executing within the persistent attack campaign detection engine;
extract, by the incident model microservice, artifacts from the incident;
map, by the incident model microservice, the artifacts to a graph topology data structure, wherein the graph topology data structure comprises a two-layer graph topology, wherein a first layer contains incidents and linkages between the incidents by type and wherein the second layer contains mappings between incident artifacts and probabilities that the incident artifacts are correlated together;
store, by the incident model microservice, the graph topology data structure in a graph data storage;
collect, by an ontology modeling suite executing within the persistent attack campaign detection engine, security data from a document data storage;
build, by the ontology modeling suite, a security ontology data structure and storing the security ontology data structure in an ontology data storage;
map, by the ontology modeling suite, concepts from the security ontology data structure to the graph topology data structure;
perform, by a custom insight engine executing within the persistent attack campaign detection engine, insights based on the graph topology data structure; and
output, by the custom insight engine, results of the insights to a user in human readable form.

10. The computer program product of claim 9, wherein extracting artifacts from the incident comprises extracting primary incident artifacts that describe an indicator of compromise.

11. The computer program product of claim 9, wherein extracting artifacts from the incident comprises collecting the artifacts from a security information and event management (SEM) application programming interface (API) ecosystem via API requests.

12. The computer program product of claim 9, wherein building the security ontology data structure comprises using a unified query language to interact with a document parser and a crawler to build a formal ontology.

13. The computer program product of claim 9, wherein extracting artifacts from the incident comprises extracting secondary incident artifacts that provide metadata about an incident or asset in question.

14. The computer program product of claim 9, wherein performing insights based on the graph topology data structure comprises:
querying the graph topology data structure;
examining patterns using probability inference from a probability network in the graph topology data structure; and
applying user generated custom insight rules to the patterns.

15. An apparatus comprising:
a processor; and
a memory coupled to the processor, wherein the memory comprises instructions which, when executed by the processor, cause the processor to implement an ontology based persistent attack campaign detection engine, wherein the instructions causes the processor to:
in response to a security incident, send the security incident to an incident model microservice executing within the persistent attack campaign detection engine;

extract, by the incident model microservice, artifacts from the incident;

map, by the incident model microservice, the artifacts to a graph topology data structure, wherein the graph topology data structure comprises a two-layer graph topology, wherein a first layer contains incidents and linkages between the incidents by type and wherein the second layer contains mappings between incident artifacts and probabilities that the incident artifacts are correlated together;

store, by the incident model microservice, the graph topology data structure in a graph data storage;

collect, by an ontology modeling suite executing within the persistent attack campaign detection engine, security data from a document data storage;

build, by the ontology modeling suite, a security ontology data structure and storing the security ontology data structure in an ontology data storage;

map, by the ontology modeling suite, concepts from the security ontology data structure to the graph topology data structure;

perform, by a custom insight engine executing within the persistent attack campaign detection engine, insights based on the graph topology data structure; and output, by the custom insight engine, results of the insights to a user in human readable form.

16. The apparatus of claim 15, wherein extracting artifacts from the incident comprises extracting primary incident artifacts that describe an indicator of compromise.

17. The apparatus of claim 15, wherein extracting artifacts from the incident comprises collecting the artifacts from a security information and event management (SIEM) application programming interface (API) ecosystem via API requests.

18. The apparatus of claim 15, wherein building the security ontology data structure comprises using a unified query language to interact with a document parser and a crawler to build a formal ontology.

19. The apparatus of claim 15, wherein extracting artifacts from the incident comprises extracting secondary incident artifacts that provide metadata about an incident or asset in question.

20. The apparatus of claim 15, wherein performing insights based on the graph topology data structure comprises:

querying the graph topology data structure;

examining patterns using probability inference from a probability network in the graph topology data structure; and applying user generated custom insight rules to the patterns.

* * * * *